(No Model.)
N. LINSLEY.
SPRING HINGE.
No. 395,337. Patented Jan. 1, 1889.
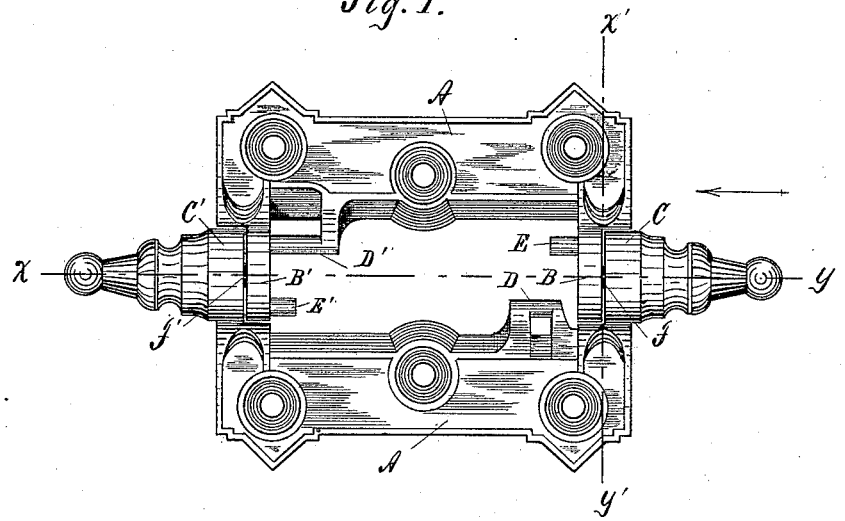
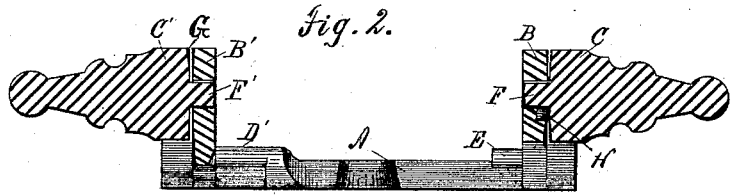
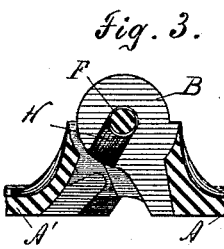
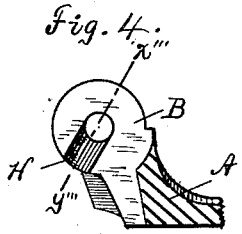
Witnesses:
C. W. Graham,
J. A. Crain
Inventor:
Newton Linsley
By Wiles & Greene
Attorneys.

UNITED STATES PATENT OFFICE.

NEWTON LINSLEY, OF FREEPORT, ILLINOIS.

SPRING-HINGE.

SPECIFICATION forming part of Letters Patent No. 395,337, dated January 1, 1889.

Application filed February 21, 1887. Serial No. 228,430. (No model.)

*To all whom it may concern:*

Be it known that I, NEWTON LINSLEY, a resident of Freeport, in the county of Stephenson and State of Illinois, have invented certain new and useful Improvements in Spring-Hinges; and I do hereby declare the following to be a full, clear, and exact description of the invention, such as will enable others skilled in the art to which it pertains to make and use the same.

My invention relates particularly to improvements in spring-hinge leaves of the class in which the central or middle portion of the hinge-pintle is wanting, the leaves turning upon short end gudgeons. Various expedients have been adopted to render hinges either right or left hand and at the same time to avoid the expense of pintles distinct from the leaves. It is also desirable that the leaves of each hinge when put together should not be liable to accidental detachment either with or without the action of the spring. My invention takes advantage of the natural elasticity of the leaves to slightly separate the ears of one leaf and to compress or bring together the ears of the opposite leaf in uniting the two. When perfectly adjusted together, the construction permits all parts of each leaf to resume the normal position, with the result that the leaves may be separated only with some difficulty when the spring is not in place, while their separation is impossible after the spring is in position.

In the accompanying drawings, Figure 1 is a plan of a pair of hinge-leaves united; Fig. 2, a section on the line $x\, y$, Fig. 1. Fig. 3 is a section on the line $x'\, y'$, Fig. 1, looking in the direction of the arrow. Fig. 4 shows the grooved ear of Fig. 3 detached from the ear of the other leaf. Fig. 5 is a section on the line $x'''\, y'''$ of Fig. 4.

In all the drawings, A A' are the leaves, having, respectively, the integrally-formed ears B B' C C'. The ears C C' are provided with short inwardly-projecting pintle-gudgeons F F', and the ears B B' with central perforations adapted to receive these gudgeons. The ear B is further provided upon its outer face with a groove, H, equal in width to the diameter of the gudgeon F. The depth of the groove, which extends from the circumference of the ear to the central aperture, is slight at the aperture and nearly equal to the thickness of the ear at the circumference. Now, in putting the two leaves together to form a hinge the ear B' is placed over the gudgeon F', the other end of the hinge-leaf being raised above the plane of the leaf A' and pushed outward as far as the slightly-rounded portion G of the ear C' will readily permit. The other ear, B, is then carried downward in such a direction that the gudgeon F may enter the groove H, its end pressing the bottom of the groove. By continuing the pressure upon the ear B the inclined plane of the bottom of the groove H, passing over the end of the pintle-gudgeon F, springs the ears C C' apart and the ears B B' together until the gudgeon reaches the central aperture in the ear B, when the recoil of the parts instantly forces the gudgeon into engagement with the ear B, locking the leaves together. They can now be separated only by applying such force as will again spring the several parts to the same extent as in putting the leaves together, and when the spring-pintle or spring-frame is in position, filling the space between the ears B B', detachment is impossible, for the proportion of the parts is such that the outer ears, C C', alone cannot, without breaking, yield sufficiently to permit separation. The groove H is so placed that it meets the aperture at a point where the wear is inconsiderable. Consequently the hinge in action and durability is practically identical with hinges having an independently-formed pintle. Indeed it is not essential that these gudgeons be formed integrally with the ears, but it is important on the score of economy, for by this means one leaf may be cast complete without cores. Another advantage of this construction is that parts of the ears that are visible when the hinge is in place upon the door are entire, unsightly slots being avoided.

The spring or spring-frame may be attached to the leaves in any of the usual ways, the loops D D' and pins E E', for example, serving for this purpose. No novelty in this respect is claimed, however.

In view, then, of the fact that it is thought to be new to form the leaves of spring-hinges in such a manner that the elastic force of the metal of which they are composed must be overcome to a certain degree in uniting each pair of leaves to form a hinge and that said force must be similarly overcome in order to separate the leaves when once they have been united,

What I claim is—

The combination of the leaf A', provided with integrally-formed ears C C', bearing inwardly-projecting gudgeon F F', respectively, and the leaf A, provided with the ear B, perforated to receive one of said gudgeons, and with the leaf B', similarly perforated to receive the remaining gudgeon, and provided with a gradually-deepening groove, H, in its outer face, extending from the gudgeon-receiving perforation to the margin of the ear, substantially as and for the purpose set forth.

In testimony whereof I have signed this specification in the presence of two subscribing witnesses.

NEWTON LINSLEY.

Witnesses:
C. W. GRAHAM,
J. A. CRAIN.